(12) United States Patent
Xu et al.

(10) Patent No.: US 10,558,054 B2
(45) Date of Patent: Feb. 11, 2020

(54) DISPLAY APPARATUS AND THREE-DIMENSIONAL DISPLAY METHOD THEREOF

(71) Applicants: BOE Technology Group Co., Ltd., Beijing (CN); Beijing BOE Optoelectronics Technology Co., Ltd., Beijing (CN)

(72) Inventors: Rui Xu, Beijing (CN); Xiaochuan Chen, Beijing (CN); Wenqing Zhao, Beijing (CN); Ming Yang, Beijing (CN); Pengcheng Lu, Beijing (CN); Jian Gao, Beijing (CN); Xiaochen Niu, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 150 days.

(21) Appl. No.: 15/538,172

(22) PCT Filed: Nov. 8, 2016

(86) PCT No.: PCT/CN2016/104970
§ 371 (c)(1),
(2) Date: Jun. 20, 2017

(87) PCT Pub. No.: WO2017/118204
PCT Pub. Date: Jul. 13, 2017

(65) Prior Publication Data
US 2017/0371171 A1 Dec. 28, 2017

(30) Foreign Application Priority Data
Jan. 5, 2016 (CN) .......................... 2016 1 0006075

(51) Int. Cl.
*G02F 1/1347* (2006.01)
*G02F 1/133* (2006.01)
(Continued)

(52) U.S. Cl.
CPC ....... *G02B 27/2214* (2013.01); *G02B 27/225* (2013.01); *G02F 1/13306* (2013.01);
(Continued)

(58) Field of Classification Search
CPC .............. G02F 2201/44; G02F 1/1347; G02F 1/13306; H01L 27/3232; G02B 27/225; G02B 27/2214; G09G 3/3208
See application file for complete search history.

(56) References Cited

U.S. PATENT DOCUMENTS

2003/0080953 A1 5/2003 Ting
2005/0157223 A1* 7/2005 Sung ...................... H04N 13/32
349/69
(Continued)

FOREIGN PATENT DOCUMENTS

CN 1314669 A 9/2001
CN 102466906 A 5/2012
(Continued)

OTHER PUBLICATIONS

Dec. 29, 2016—(WO) International Search Report and Written Opinion Appn PCT/CN2016/104970 with English Tran.
(Continued)

*Primary Examiner* — Nathanael R Briggs
*Assistant Examiner* — Anthony G Quash
(74) *Attorney, Agent, or Firm* — Banner & Witcoff, Ltd.

(57) ABSTRACT

The present disclosure relates to a display apparatus and a three-dimensional display method thereof. A via hole at least passing through a base substrate is formed in an array substrate of a liquid crystal display panel, and a signal line
(Continued)

on an upper surface of the array substrate can be connected with a driving chip bonded onto an electroluminescent display substrate, through the via hole on a lower surface of the array substrate and through a conductive material in an optical clear adhesive. A signal line on the electroluminescent display substrate also can be connected with a driving chip bonded onto an upper surface of the array substrate, through the conductive material in the optical clear adhesive on a lower surface of the array substrate and through the via hole.

17 Claims, 4 Drawing Sheets

(51) Int. Cl.
*G02B 27/22* (2018.01)
*H01L 27/32* (2006.01)
*G09G 3/3208* (2016.01)
*G09G 3/36* (2006.01)
*H04N 13/324* (2018.01)
*H04N 13/31* (2018.01)
*G02F 1/1333* (2006.01)
*G02F 1/1362* (2006.01)
*G09G 3/00* (2006.01)
*G02F 1/1335* (2006.01)

(52) U.S. Cl.
CPC .. *G02F 1/133362* (2013.01); *G02F 1/136227* (2013.01); *G09G 3/3208* (2013.01); *G09G 3/36* (2013.01); *H04N 13/31* (2018.05); *H04N 13/324* (2018.05); *G02F 1/133514* (2013.01); *G02F 2201/44* (2013.01); *G09G 3/003* (2013.01)

(56) References Cited

U.S. PATENT DOCUMENTS

| | | | |
|---|---|---|---|
| 2011/0273377 A1* | 11/2011 | Merz | G09G 3/20 345/173 |
| 2013/0082915 A1* | 4/2013 | Nakagawa | G09G 3/3688 345/92 |
| 2014/0104556 A1 | 4/2014 | Takagi et al. | |
| 2015/0212613 A1* | 7/2015 | Fowlkes | G06F 3/046 345/173 |
| 2017/0139218 A1 | 5/2017 | Lu et al. | |
| 2017/0193931 A1* | 7/2017 | Han | G09G 3/3266 |

FOREIGN PATENT DOCUMENTS

| | | | | |
|---|---|---|---|---|
| CN | 103048835 A | | 4/2013 | |
| CN | 104360520 A | | 2/2015 | |
| CN | 104834104 A | | 8/2015 | |
| CN | 105206625 A | | 12/2015 | |
| CN | 105607270 A | | 5/2016 | |
| JP | 2009258565 A | | 11/2009 | |
| JP | 2012093451 A | | 5/2012 | |
| JP | 2012203233 A | * | 10/2012 | ............ G02B 5/02 |
| WO | 2015094601 A2 | | 6/2015 | |
| WO | WO-2015094601 A2 | * | 6/2015 | ............ G06F 3/0412 |

OTHER PUBLICATIONS

Dec. 28, 2017—(CN) Second Office Action Appn 201610006075.X with English Tran.

Aug. 1, 2017—(CN) First Office Action Appn 201610006075.Xwith English Tran.

* cited by examiner

DISPLAY APPARATUS AND THREE-DIMENSIONAL DISPLAY METHOD THEREOF

The application is a U.S. National Phase Entry of International Application No. PCT/CN2016/104970 filed on Nov. 8, 2016, designating the United States of America and claiming priority to Chinese Patent Application No. 201610006075.X filed on Jan. 5, 2016. The present application claims priority to and the benefit of the above-identified applications and the above-identified applications are incorporated by reference herein in their entirety.

TECHNICAL FIELD

Embodiments of the present disclosure relate to a display apparatus and a three-dimensional display method thereof.

BACKGROUND

In recent years, a three-dimensional (3D) display technology is rapidly developed. Naked eye 3D display does not require a user to wear glasses, and thus, compared to a glasses-type 3D technology, the naked eye 3D display attracts more attention. Due to advantages of simple process, small crosstalk and the like, a grating-type naked eye 3D technology is widely applied to a naked eye 3D apparatus.

SUMMARY

Embodiments of the present disclosure provide a display apparatus and a three-dimensional display method thereof, which are configured for solving a problem of relatively complex driving of a display apparatus formed by a liquid crystal display panel with a post grating of electroluminescent display device.

At least one embodiment of the present disclosure provides a display apparatus, including: a liquid crystal display panel including an array substrate, an electroluminescent display substrate fixed below the array substrate by a conductive optical clear adhesive, and a driving chip bonded on the electroluminescent display substrate or the array substrate.

For example, a via hole at least passing through a base substrate of the array substrate is formed in the array substrate of the liquid crystal display panel; a signal line of the array substrate on an upper surface of the array substrate is connected with the driving chip combined on the electroluminescent display substrate, through the via hole and a conductive material in the optical clear adhesive on a lower surface of the array substrate, or a signal line on the electroluminescent display substrate is connected with the driving chip combined on an upper surface of the array substrate through a conductive material in the optical clear adhesive on a lower surface of the array substrate and the via hole; and the driving chip is configured to supply electric signals to the liquid crystal display panel and the electroluminescent display substrate.

For example, in the display apparatus provided by one embodiment of the present disclosure, the signal line includes data lines.

For example, each data line on the electroluminescent display substrate and at least one data line on the array substrate of the liquid crystal display panel are commonly connected to a same connecting terminal of the driving chip.

For example, in the display apparatus provided by one embodiment of the present disclosure, pixel columns in the electroluminescent display substrate and pixel columns in the liquid crystal display panel are in one-to-one correspondence, and each pixel in the liquid crystal display panel consists of at least two sub pixels arranged in a row direction.

For example, each data line on the electroluminescent display substrate corresponds to one of the pixel columns in the electroluminescent display substrate.

For example, each data line on the array substrate of the liquid crystal display panel corresponds to one sub pixel column in the liquid crystal display panel; the data lines on the array substrate of the liquid crystal display panel, which correspond to the sub pixel columns of a same pixel column respectively, are connected with one connecting terminal, by controllable switching units connected with the data lines in one-to-one correspondence; and the respective data lines corresponding to the respective sub pixel columns of the same pixel column are connected with the respective controllable switching units, and the respective controllable switching units are configured to control time-sharing conduction of the connected data lines and the connecting terminal.

For example, in the display apparatus provided by one embodiment of the present disclosure, the respective controllable switching units are arranged on the array substrate of the liquid crystal display panel.

For example, the array substrate further includes switching control lines of which the number is the same with that of the sub pixels which each pixel includes, and signal leads connected with the connecting terminals in one-to-one correspondence.

For example, in the display apparatus provided by one embodiment of the present disclosure, each controllable switching unit includes a switching transistor.

For example, a source electrode of the switching transistor is connected with the data line, a drain electrode of the switching transistor is connected with the signal lead, and a gate electrode of the switching transistor is connected with the switching control line.

For example, in the display apparatus provided by one embodiment of the present disclosure, a color of light emitted from each pixel in the electroluminescent display substrate is white, and lights emitted from the sub pixels of a same pixel in the liquid crystal display panel are different in color.

For example, in the display apparatus provided by one embodiment of the present disclosure, the signal line includes gate lines.

For example, the respective gate line on the electroluminescent display substrate and the respective gate line on the array substrate of the liquid crystal display panel are in one-to-one correspondence, and the gate line on the electroluminescent display substrate and the corresponding gate line on the array substrate of the liquid crystal display panel are commonly connected to a same connecting terminal of the driving chip.

For example, in the display apparatus provided by one embodiment of the present disclosure, shift registers are respectively arranged on the array substrate of the liquid crystal display panel and the electroluminescent display substrate, and the signal lines includes signal lines for providing electric signals to the shift registers.

For example, in the display apparatus provided by one embodiment of the present disclosure, an optical prism film for uniformly dispersing brightness of emergent light of the electroluminescent display substrate is arranged on a light emitting surface of the electroluminescent display substrate.

At least one embodiment of the present disclosure provides a three-dimensional display method of the display apparatus, including following steps.

In a three-dimensional display mode, by the driving chip, controlling the respective pixels in the electroluminescent display substrate to form light emitting regions in a column direction and black regions in the column direction, which are arranged alternately; and controlling the pixel columns of a same light emitting region in the liquid crystal display panel to display different viewpoint images.

For example, in the three-dimensional display method provided by one embodiment of the present disclosure, in the three-dimensional display mode, the driving chip inputs a low-level signal to a reference signal end connected with a source electrode of a drive transistor in a pixel circuit of the respective pixels constituting the black regions in the electroluminescent display substrate.

BRIEF DESCRIPTION OF THE DRAWINGS

In order to clearly illustrate the technical solution of the embodiments of the disclosure, the drawings of the embodiments will be briefly described in the following. It is obvious that the described drawings are only related to some embodiments of the disclosure, but not intended to limit the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms here should be of general meaning as understood by those ordinarily skilled in the art. In the present disclosure, words such as "first", "second" and the like do not denote any order, quantity, or importance, but rather are used for distinguishing different components. Similarly, words such as "one", "a/an" or "the" or the like do not denote quantitative limitation, but rather indicate there is at least one. Words such as "include" or "comprise" and the like denote that elements or objects appearing before the words of "include" or "comprise" cover the elements or the objects enumerated after the words of "include" or "comprise" or equivalents thereof, not exclusive of other elements or objects. Words such as "connected" or "connecting" and the like are not limited to physical or mechanical connections, but may include electrical connection, either direct or indirect. Words such as "up", "down", "left", "right" and the like are only used for expressing relative positional relationship, when the absolute position of a described object is changed, the relative positional relationship may also be correspondingly changed.

A shape and a magnitude of each part on each film layer in the drawings do not reflect the true scale of a display apparatus, and only aim to schematically illustrate contents of the present disclosure.

An electroluminescent display is easy to form various black and white state structures due to utilization of a self-light-emitting principle; some specific black and white structures are grating structures; due to cases that black state brightness of the electroluminescent display is nearly equal to zero and contrast of black and white states is relatively high, the electroluminescent display is easy to obtain low-crosstalk 3D display. Therefore, when the electroluminescent display is used as a post grating of a liquid crystal display screen to implement three-dimensional display, low-crosstalk three-dimensional display can be obtained. The post electroluminescent display used as the grating has the advantages above, but both the electroluminescent display and the front liquid crystal display screen need to be controlled by independent driving chips, and thus relatively complex to drive.

Figure 1A:
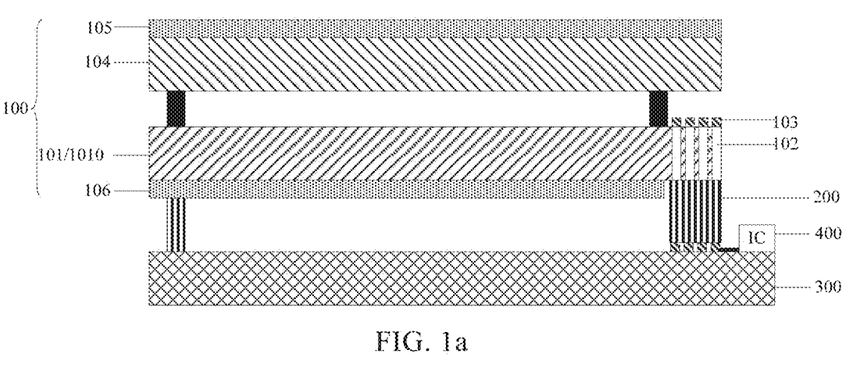
FIG. 1a, FIG. 1b and FIG. 1c respectively are structural schematic diagrams of a display apparatus provided by an embodiment of the present disclosure.
Figure 1B:
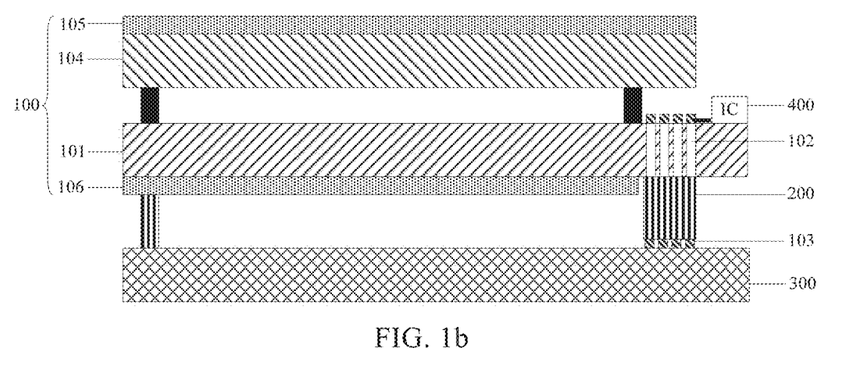

At least one embodiment of the present disclosure provides a display apparatus, as shown in FIG. 1a and FIG. 1b, including: a liquid crystal display panel 100 with an array substrate 101, an electroluminescent display substrate 300 fixed below the array substrate 101 by a conductive optical clear adhesive (OCA) 200, and a driving chip 400 bonded onto the electroluminescent display substrate 300 as shown in FIG. 1a or bonded onto the array substrate 101 as shown in FIG. 1b. The electroluminescent display substrate 300, for example, can be an organic light emitting diode (OLED) display substrate.

A via hole 102 at least passing through a base substrate 1010 of the array substrate 101 is formed in the array substrate 101 of the liquid crystal display panel 100; and as shown in FIG. 1a, a signal line 103 of the array substrate 101 on an upper surface of the array substrate 101 is connected with the driving chip (IC) 400 fixed onto the electroluminescent display substrate 300, through the via hole 102 and through a conductive material in the optical clear adhesive 200 on a lower surface of the array substrate 101. Or, as shown in FIG. 1b, a signal line 103 of the electroluminescent display substrate 300 is connected with the driving chip 400 bonded onto the upper surface of the array substrate 101, through the conductive material in the optical clear adhesive 200 on the lower surface of the array substrate 101 and through the via hole 102. The driving chip 400 is configured to provide electric signals to the liquid crystal display panel 100 and the electroluminescent display substrate 300 respectively. For example, the via hole 102 can further run through at least one insulating layer arranged on the base substrate of the array substrate 101. The insulating layer is not shown in the drawings of the embodiments of the present disclosure. It can be determined as required which layers the via hole 102 runs through, and the embodiments of the present disclosure do not limit it.

Generally, the liquid crystal display panel 100 in the display apparatus provided by the embodiment of the present disclosure, as shown in FIG. 1a and FIG. 1b, except being provided with the array substrate 101, may also be provided with an opposed substrate 104 arranged opposite to the array substrate 101, an upper polarizer 105 arranged on an upper surface of the opposed substrate 104, and a lower polarizer 106 arranged on the lower surface of the array substrate 101.

For example, the electroluminescent display substrate 300 in the display apparatus provided by the embodiment of the present disclosure can refers to an electroluminescent display backplane with a packaging cover board, or an electroluminescent display backplane which uses the array substrate of the liquid crystal display panel as a packaging cover board, and is not limited herein.

For example, the display apparatus provided by the embodiment of the present disclosure can be any product or part with a display function, e.g., a mobile phone, a watch, a tablet personal computer, a television, a display, a notebook computer, a digital photo frame, a navigator and the like.

In the display apparatus provided by the embodiment of the present disclosure, after the via hole 102 at least passing through the base substrate is formed in the array substrate 101 of the liquid crystal display panel 100, the via hole 102 is filled with a conductive substance by injecting or penetrating, and the signal line 103 on the upper surface of the array substrate can be connected with the driving chip 400 bonded onto the electroluminescent display substrate 300, through the via hole 102 and through the conductive material, e.g., Au balls, in the optical clear adhesive 200 the lower surface of the array substrate 101; or the signal line on the electroluminescent display substrate 300 is connected with the driving chip 400 bonded onto the upper surface of the array substrate 101, through the conductive material in the optical clear adhesive 200 on the lower surface of the array substrate 101 and through the via hole 102. Therefore, the driving chip 400 can be only bonded onto one of the electroluminescent display substrate 300 and the array substrate 101 for providing the electric signals to the liquid crystal display panel 100 and the electroluminescent display substrate 300 respectively, thus omitting arrangement of a driving chip on the other one of the electroluminescent display substrate 300 and the array substrate 101 of the liquid crystal display panel 100. One driving chip 400 is adopted to simultaneously control the liquid crystal display panel 100 and the electroluminescent display substrate 300, thereby avoiding problems easy to generate in the signal synchronization for example caused by respective adoption of the separate driving chips, greatly simplifying driving complexity and also saving cost.

For example, in the display apparatus provided by the embodiment of the present disclosure, when one driving chip 400 is adopted to simultaneously control the liquid crystal display panel 100 and the electroluminescent display substrate 300, pins of the driving chip 400 may respectively and separately correspond to the signal lines in the electroluminescent display substrate 300 and the signal lines 103 in the liquid crystal display panel 100; in this case, due to the relatively great number of the signal lines in two display panels, the number of the pins of the driving chip 400 can be greatly increased, which is disadvantageous for simplifying a driving process and reducing cost of the driving chip 400.

Therefore, when the signal line 103 in the liquid crystal display panel 100, which are connected to the electroluminescent display substrate 300 through the via hole 102, includes a data line, or when the signal line 103 in the electroluminescent display substrate 300, which are connected to the liquid crystal display panel 100 through the via hole 102, includes a data line, the respective data lines on the electroluminescent display substrate 300 and at least one data line on the array substrate 101 of the liquid crystal display panel 100 can share one pin of the driving chip 400, i.e., can be commonly connected to a same connecting terminal of the driving chip 400, so that the driving chip 400 only needs to support a data signal channel of the electroluminescent display substrate 300, and cost of the driving chip 400 is also reduced.

Further, in the display apparatus provided by the embodiment of the present disclosure, the electroluminescent display substrate 300 is only configured for providing backlight in two-dimensional display mode, and is further configured for providing a strip grating in three-dimensional display mode, and thus, resolution of the electroluminescent display substrate 300 generally can be lower than that of the liquid crystal display panel 100. Generally, pixel columns in the electroluminescent display substrate 300 and pixel columns in the liquid crystal display panel 100 can be in a one-to-one correspondence, and each pixel in the liquid crystal display panel 100 is generally comprised by at least two sub pixels arranged in a row direction; the electroluminescent display substrate 300 only provides the backlight, and thus, each pixel in the electroluminescent display substrate 300 may be not partitioned into sub pixels, so that each data line on the electroluminescent display substrate 300 corresponds to one pixel column in the electroluminescent display substrate 300. The liquid crystal display panel 100 needs to carry out chroma display of an image, and thus, each data line on the array substrate 101 of the liquid crystal display panel 100 corresponds to one column of sub pixel in the liquid crystal display panel 100. Therefore, the respective data lines on the array substrate 101 of the liquid crystal display panel 100, which corresponds to the sub pixel columns of a same pixel column, are connected with one connecting terminal by controllable switching units which are connected with the data lines in one-to-one correspondence; the respective data lines corresponding to the respective sub pixel column of the same pixel column are connected with the respective controllable switching units; the respective controllable switching unit are configured to control time-sharing conduction of the connected data lines and the connecting terminal. Therefore, by the driving chip 400 applicable to the electroluminescent display substrate 300 with the relatively low resolution, not only a data signal of the electroluminescent display substrate 300, but also a data signal of the liquid crystal display panel 100 can be provided.

Moreover, a color of light emitted from each pixel in the electroluminescent display substrate 300 is white; lights emitted from the sub pixels of the same pixel in the liquid crystal display panel 100 are different in color; the electroluminescent display substrate 300 is provided as a backlight with adjustable gray scale brightness, and power consumption of the backlight can be correspondingly reduced. For example, one pixel includes a plurality of sub pixels. For example, one pixel includes, but is not limited to, three R, G and B sub pixels.

Figure 2:
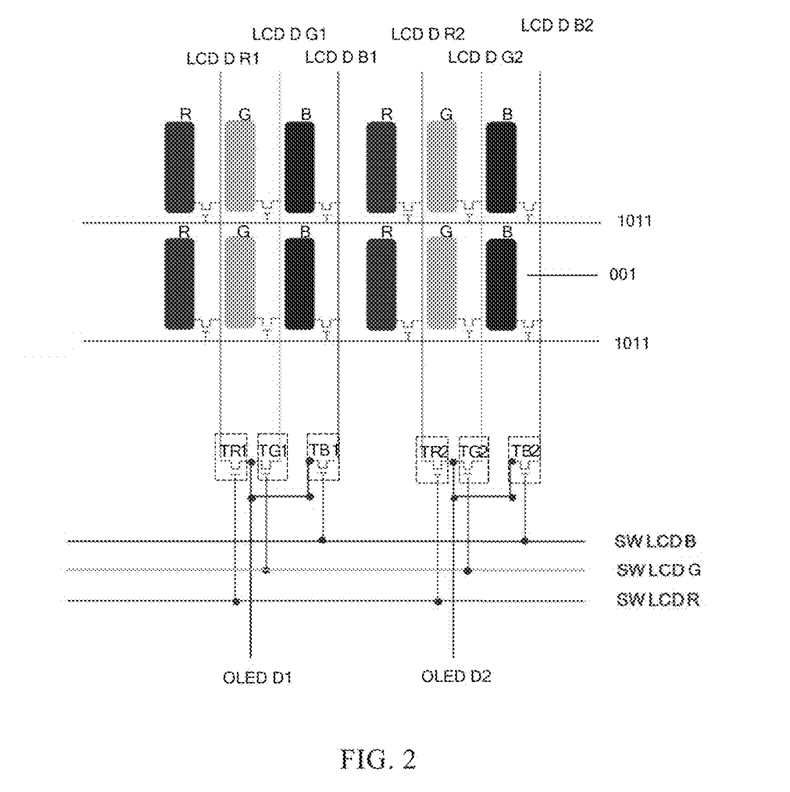
FIG. 2 is a structural schematic diagram of an array substrate in the display apparatus provided by an embodiment of the present disclosure.

For example, as shown in FIG. 2, the array substrate of the display panel includes a plurality of gate lines 1011 and a plurality of data lines LCD D, the plurality of gate lines 1011 and the plurality of data lines LCD D are insulated from each other and intersect to define a plurality of sub pixels 001. For example, an array of the sub pixels can be formed on the base substrate of the array substrate 101, and each sub pixel can include a gate line, a data line, a switching unit (e.g., a thin film transistor) and a pixel electrode. A common electrode can be formed on the array substrate, and can also be formed on the opposed substrate so as to form the liquid crystal display panels in different modes; the modes of the liquid crystal panel, for example, include a twisted nematic (TN) display mode, an advanced-super dimensional switching (ADS) display mode, an in-plane switching (IPS) display mode and the like. For example, the gate line is configured to provide an electric signal to a gate electrode of the thin film transistor, the data line is configured to provide an electric signal to a source electrode of the thin film transistor, and the pixel electrode can be electrically connected with a drain electrode of the thin film transistor. The source electrode and the drain electrode of the thin film transistor can be interchanged. In FIG. 1a, except for the signal line 103 and the via hole 102, other structures of the array substrate are not shown.

Figure 3:
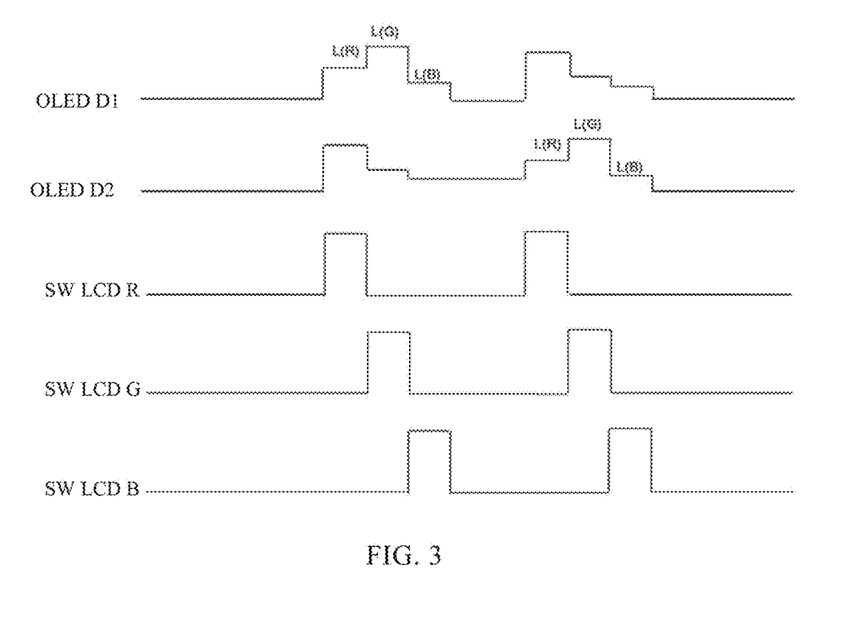
FIG. 3 is a signal timing diagram corresponding to FIG. 2.

For example, a circuit structural diagram shown in FIG. 2 and a circuit timing diagram shown in FIG. 3 illustrate by taking a case that each pixel in the liquid crystal display panel 100 consists of three R, G and B sub pixels as an example, a signal of one data line OLED D1 on the electroluminescent display substrate 300 corresponds to signals of three data lines LCD D R1, LCD D G1 and LCD D B1 on the liquid crystal display panel 100, and a signal of another data line OLED D2 on the electroluminescent display substrate 300 corresponds to signals of another three data lines LCD D R2, LCD D G2 and LCD D B2 on the liquid crystal display panel 100.

For example, in the display apparatus provided by the embodiment of the present disclosure, the controllable switching units for carrying out time-sharing conduction of the connecting terminal and the data lines on the liquid crystal display panel 100 can be arranged on the array substrate 101 of the liquid crystal display panel 100, and can also be arranged on the electroluminescent display substrate 300. For example, in order to reduce the number of the signal lines 103 in the liquid crystal display panel 100, which pass through the via holes 102 passing through the base substrate of the array substrate 101, the respective controllable switching units can be arranged on the array substrate 101 of the liquid crystal display panel 100. Therefore, the array substrate 101 further includes switching control lines of which the number is the same with that of the sub pixels which each pixel includes, and signal leads connected with the connecting terminals in one-to-one correspondence; it is only needed to connect the signal lines and the switching control lines to the electroluminescent display substrate 300 through the via holes 102. Compared to a mode of connecting all the data lines of the liquid crystal display panel 100 to the electroluminescent display substrate 300 through the via holes 102, the mode adopted by the display apparatus provided by the embodiment of the present disclosure can greatly reduce the number of the signal lines passing through the via holes 102 through the base substrate of the array substrate 101.

For example, each controllable switching unit in the display apparatus provided by the embodiment of the present disclosure can include: a switching transistor (e.g., a thin film transistor). For example, a source electrode of the switching transistor is connected with the data line, a source electrode of the switching transistor is connected with the signal lead, and a gate electrode of the switching transistor is connected with the switching control line.

For example, as shown in FIG. 2, each pixel on the array substrate 101 is comprised by three sub pixels R, G and B, then three switching control lines SW LCD R, SW LCD G and SW LCD B and switching transistors TR1, TG1, TB1, TR2, TG2 and TB2 used as the controllable switching units are arranged on the array substrate 101; the source electrodes of the switching transistors TR1, TG1, TB1, TR2, TG2 and TB2 respectively and correspondingly connected with the data lines LCD D R1, LCD D G1, LCD D B1, LCD D R2, LCD D G2 and LCD D B2 on the array substrate 101; the respective drain electrodes of the switching transistors TR1, TG1 and TB1 are connected with the OLED D1, the respective drain electrodes of the switching transistors TR2, TG2 and TB2 are connected with the OLED D2; the respective gate electrodes of the switching transistors TR1 and TR2 are connected with the switching control line SW LCD R; the respective gate electrodes of the switching transistors TG1 and TG2 are connected with the switching control line SW LCD G; and the respective gate electrodes of the switching transistors TB1 and TB2 are connected with the switching control line SW LCD B.

FIG. 3 shows signals of the switching control lines SW LCD R, SW LCD G and SW LCD B, OLED D1 and OLED D2, which are provided by the driving chip 400, wherein the signals of the OLED D1 and OLED D2 respectively provide voltages corresponding to three gradients of three data lines in the liquid crystal display panel 100, and when the switching control lines SW LCD R, SW LCD G and SW LCD B are turned on in a time-sharing mode, the signals of the OLED D1 and the OLED D2 are transferred in a time-sharing mode into the correspondingly conducted data lines in the liquid crystal display panel 100 to provide the data signals for the data lines so as to implement display. Meanwhile, the signals of the OLED D1 and the OLED D2 are directly transferred into the data lines in the electroluminescent display substrate 300 to control the gray scale backlight of the electroluminescent display substrate 300.

Figure 1C:
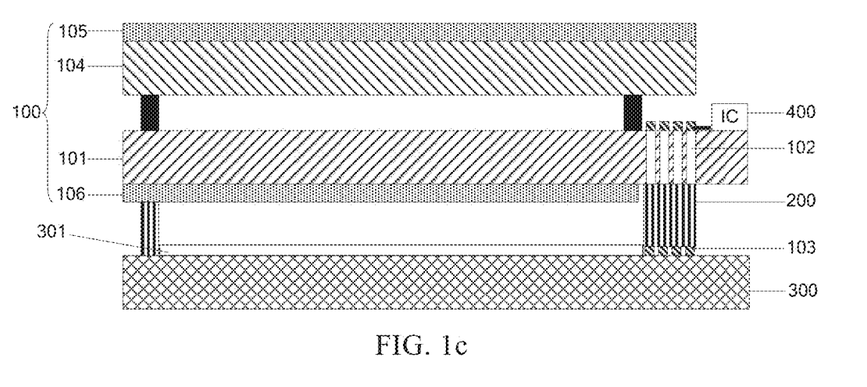

However, when backlight driving of the electroluminescent display substrate 300 is carried out in the mode above, the signals of the OLED D1 and the OLED D2 are different in gradient voltage at different moments, and thus, it may possibly cause unevenness of light emitting brightness of an integral panel of the electroluminescent display substrate 300 used as the backlight at the same moment. Therefore, further, an optical prism film 301 for uniformly dispersing brightness of emergent light of the electroluminescent display substrate 300 can also be arranged on a light emitting surface of the electroluminescent display substrate 300, as shown in FIG. 1c.

For example, in the display apparatus provided by the embodiment of the present disclosure, the number of the pixel rows in the liquid crystal display panel 100 and the number of the pixel rows in the electroluminescent display substrate 300 can be the same or be different, and the case that the row of the pixel numbers are the same is as an example below. When the signal line 103 in the liquid crystal display panel 100, which are connected to the electroluminescent display substrate 300 through the via hole 102, includes the gate line 1011 (as shown in FIG. 2), or when the signal line 03 in the electroluminescent display substrate 300, which are connected to the liquid crystal display panel 100 through the via hole 102, includes a gate line 3011 (the gate line in the electroluminescent display substrate 300 can refer to FIG. 5, and FIG. 5 also shows a data line 3002 in the electroluminescent display substrate 300); the gate lines on the electroluminescent display substrate 300 and the gate lines on the array substrate 101 of the liquid crystal display panel 100 can be in one-to-one correspondence, and gate line on the electroluminescent display substrate 300 and the corresponding gate line on the array substrate 101 of the liquid crystal display panel 100 are commonly connected to a same connecting terminal of the driving chip 400.

However, when the above mode is adopted, the respective gate lines in the liquid crystal display panel 100 needs to be connected to the electroluminescent display substrate 300 through the via holes 102 one by one; or the respective gate lines in the electroluminescent display substrate 300 needs to be connected to the liquid crystal display panel 100 through the via holes 102 one by one, and a relatively great number of via holes 102 need to be used, which are unbeneficial to implementation. Therefore, Gate on Array (GOA) shift registers can be respectively arranged in the liquid crystal display panel 100 and the electroluminescent display substrate 300 of the display apparatus provided by the embodiment of the present disclosure; in this case, the signal lines 103 in the liquid crystal display panel 100, which are connected to the electroluminescent display substrate 300 through the via holes 102, do not need to include a great number of gate lines, or the signal lines 103 in the electroluminescent display substrate 300, which are connected to the liquid crystal display panel 100 through the via holes 102, do not need to include a great number of gate lines, and the signal lines 103 only need to include signal lines for providing electric signals to the shift registers.

Figure 4A:
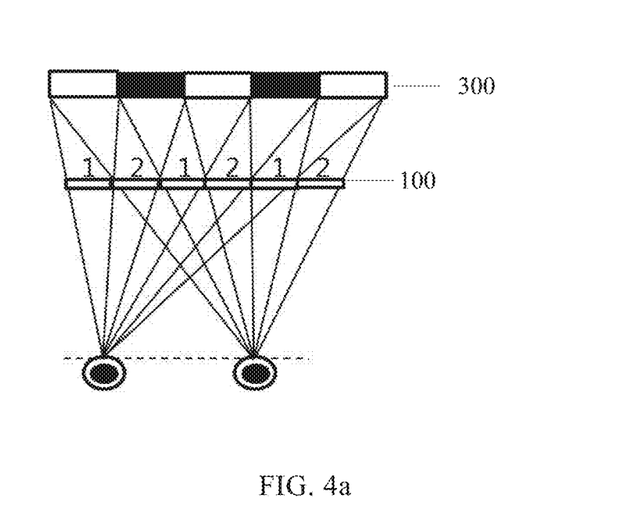
FIG. 4a is a principle schematic diagram of the display apparatus in the three-dimensional displaying provided by the embodiment of the present disclosure.

An embodiment of the present disclosure further provides a method for implementing three-dimensional display of the display apparatus, including steps below:

In a three-dimensional display mode, by driving chip, controlling the respective pixels in the electroluminescent display substrate to form light emitting regions in a column direction and black regions in the column direction, wherein the light emitting regions and the black regions are arranged alternately; and controlling the respective pixel columns in the liquid crystal display panel, which correspond to a same light emitting region, to display different viewpoint images. When left and right eyes of a person are positioned at two viewpoints respectively, the left and right eyes can receive two different images and then two different images are converged into a brain by vision of both eyes to form one image so as to generate stereoscopic vision and implement naked eye three-dimensional display at the sub pixel level. FIG. 4a shows a case of implementing two viewpoints by taking a case that one light emitting region corresponds to two columns of pixels as an example, wherein different gray scales are distinguished by "1" and "2", the left eye receives image information of which the gray scale is 1, and the right eye receives image information of which the gray scale is 2. For example, one light emitting region can correspond to three columns of pixels, i.e., a case of three viewpoints is implemented; one light emitting region can also correspond to four columns of pixels to implement four viewpoints or two viewpoints (two adjacent columns of pixels form one viewpoint), and so on.

Figure 5:
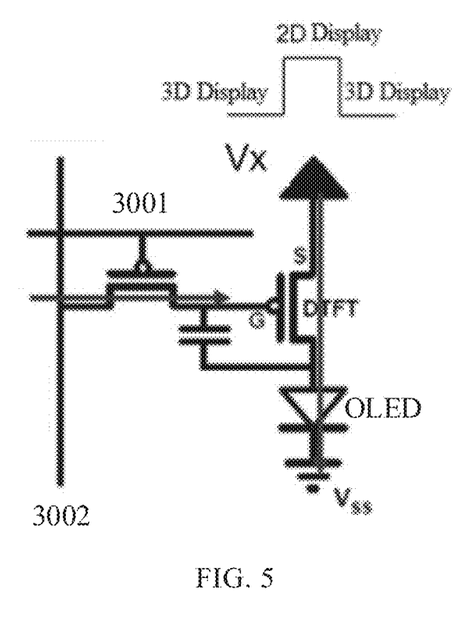
FIG. 5 is a schematic diagram of a pixel circuit in an electroluminescent display substrate of the display apparatus provided by the embodiment of the present disclosure.

For example, in the method for implementing three-dimensional display of the display apparatus, which is provided by the embodiment of the present disclosure, by one driving chip, the electroluminescent display substrate is controlled to form the light emitting regions in the column direction and the black regions in the column direction, which are arranged alternately, and simultaneously, the respective columns of pixels in the liquid crystal display panel, which correspond to the same light emitting region, are controlled to display different viewpoint images, and thus, the driving chip needs to normally output a shared data line signal to the data lines in the electroluminescent display substrate and the liquid crystal display panel so as to guarantee the pixels on the liquid crystal display panel to normally display the image. In this case, in order to ensure that the black regions, i.e., a non-light-emitting regions, are implemented in the electroluminescent display substrate, as shown in FIG. 5, the driving chip 400 needs to input a low level signal to a reference signal end Vx connected with a source electrode of a drive transistor DTFT in a pixel circuit of each pixel constituting the black regions in the electroluminescent display substrate 300, so that a voltage difference of both ends of an OLED is zero and the OLED is guaranteed not to emit light, thereby implementing the black regions. In a two-dimensional display mode, a high-level signal is input to the reference signal end Vx to guarantee the OLED to normally emit light.

Figure 4B:
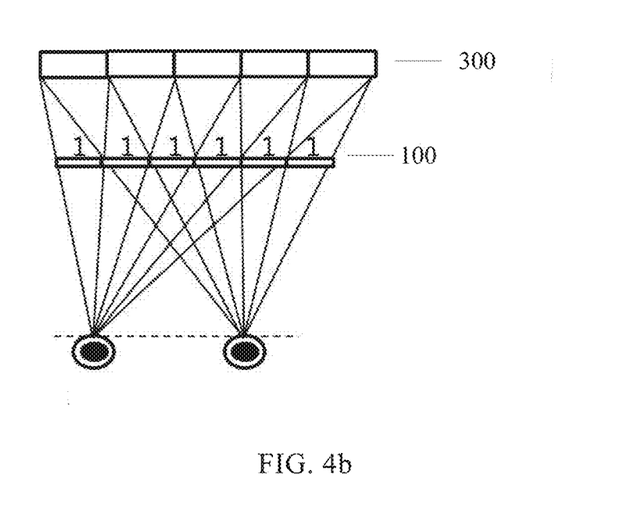
FIG. 4b is a principle schematic diagram of the display apparatus in the two-dimensional displaying provided by the embodiment of the present disclosure.

For example, when the display apparatus provided by the embodiment of the present disclosure implements two-dimensional display, the driving chip outputs signals to both the data line of the electroluminescent display substrate and the data line of the liquid crystal display panel, and at the moment, as shown in FIG. 4b, each pixel in the electroluminescent display substrate emits light, and each pixel in the liquid crystal display panel displays the same gray scale, i.e., both the left and right eyes of the person can view two same images at different viewpoints, so as to implement two-dimensional display. FIG. 4b shows a case of implementing two viewpoints by taking a case that one light emitting region corresponds to two columns of pixels as an example, wherein "1" represents the same gray scale.

According to the display apparatus and the three-dimensional display method thereof, which are provided by the embodiments of the present disclosure, the via hole at least passing through the base substrate is formed in the array substrate of the liquid crystal display panel, and the signal line on the upper surface of the array substrate can be connected with the driving chip bonded onto the electroluminescent display substrate through the via hole and through the conductive material in the optical clear adhesive on the lower surface of the array substrate, so that the driving chip can be merely bonded onto the electroluminescent display substrate, thereby omitting arrangement of the driving chip on the liquid crystal display panel. Or, the signal line on the electroluminescent display substrate also can be connected with the driving chip bonded onto upper surface of the array substrate, through the conductive material in the optical clear adhesive on the lower surface of the array substrate and through the via hole, so that the driving chip can be merely bonded onto the array substrate, and arrangement of the driving chip on the electroluminescent display substrate is omitted. In the three-dimensional display mode, one driving chip is adopted to control the respective pixels in the electroluminescent display substrate to form the light emitting regions in the column direction and the black regions in the column direction, which are arranged alternately, and control the respective column of pixels in the liquid crystal display panel, which correspond to the same light emitting region, to display different viewpoint images, thereby avoiding the problems easy to generate in the signal synchronization for example and caused by respective adoption of the separate driving chips, greatly simplifying driving complexity and also saving cost.

The foregoing embodiments merely are specific embodiments of the present disclosure, but the scope of the present disclosure is not limited thereto; those skilled in the art may easily think of variations or improvements in the technical scope disclosed by the embodiments of the present disclosure; and those variations and improvements shall fall within the scope of the present disclosure. Therefore, the scope of the disclosure is determined by the appended claims.

The present application claims priority of the Chinese Patent Application No. 201610006075.X filed on Jan. 5, 2016, the disclosure of which are incorporated herein by its reference in its entirety as part of the present application.

The invention claimed is:

1. A display apparatus, comprising: a liquid crystal display panel including an array substrate, an electroluminescent display substrate fixed below the array substrate by a conductive optical clear adhesive, and a driving chip bonded on the electroluminescent display substrate or the array substrate, wherein
a via hole at least passing through a base substrate of the array substrate is formed in the array substrate of the liquid crystal display panel; a signal line of the array substrate on an upper surface of the array substrate is connected with the driving chip combined on the electroluminescent display substrate, through the via hole and a conductive material in the optical clear adhesive on a lower surface of the array substrate, or a signal line on the electroluminescent display substrate is connected with the driving chip combined on an upper surface of the array substrate through a conductive material in the optical clear adhesive on a lower surface of the array substrate and the via hole; and the driving chip is configured to supply electric signals to the liquid crystal display panel and the electroluminescent display substrate,
wherein the signal line includes data lines, and
each data line on the electroluminescent display substrate and at least one data line on the array substrate of the liquid crystal display panel are commonly connected to a same connecting terminal of the driving chip;
wherein pixel columns in the electroluminescent display substrate and pixel columns in the liquid crystal display panel are in one-to-one correspondence, and each pixel in the liquid crystal display panel consists of at least two sub pixels arranged in a row direction;
each data line on the electroluminescent display substrate corresponds to one of the pixel columns in the electroluminescent display substrate;
each data line on the array substrate of the liquid crystal display panel corresponds to one sub pixel column in the liquid crystal display panel; the data lines on the array substrate of the liquid crystal display panel, which correspond to the sub pixel columns of a same pixel column respectively, are connected with one connecting terminal, by controllable switching units connected with the data lines in one-to-one correspondence; and the respective data lines corresponding to the respective sub pixel columns of the same pixel column are connected with the respective controllable switching units, and the respective controllable switching units are configured to control time-sharing conduction of the connected data lines and the connecting terminal; and
each data line on the electroluminescent display substrate is connected with at least two data lines on the array substrate of the liquid crystal display panel.

2. The display apparatus according to claim 1, wherein the signal line includes gate lines; and
the respective gate line on the electroluminescent display substrate and the respective gate line on the array substrate of the liquid crystal display panel are in one-to-one correspondence, and the gate line on the electroluminescent display substrate and the corresponding gate line on the array substrate of the liquid crystal display panel are commonly connected to a same connecting terminal of the driving chip.

3. The display apparatus according to claim 1, wherein shift registers are respectively arranged on the array substrate of the liquid crystal display panel and the electroluminescent display substrate, and the signal lines includes signal lines for providing electric signals to the shift registers.

4. A display apparatus, comprising: a liquid crystal display panel including an array substrate, an electroluminescent display substrate fixed below the array substrate by a conductive optical clear adhesive, and a driving chip bonded on the electroluminescent display substrate or the array substrate, wherein
a via hole at least passing through a base substrate of the array substrate is formed in the array substrate of the liquid crystal display panel; a signal line of the array substrate on an upper surface of the array substrate is connected with the driving chip combined on the electroluminescent display substrate, through the via hole and a conductive material in the optical clear adhesive on a lower surface of the array substrate, or a signal line on the electroluminescent display substrate is connected with the driving chip combined on an upper surface of the array substrate through a conductive material in the optical clear adhesive on a lower surface of the array substrate and the via hole; and the driving chip is configured to supply electric signals to the liquid crystal display panel and the electroluminescent display substrate;
the signal line includes gate lines; and
the respective gate line on the electroluminescent display substrate and the respective gate line on the array substrate of the liquid crystal display panel are in one-to-one correspondence, and the gate line on the electroluminescent display substrate and the corresponding gate line on the array substrate of the liquid crystal display panel are commonly connected to a same connecting terminal of the driving chip.

5. The display apparatus according to claim 4, wherein the signal line includes data lines; and
each data line on the electroluminescent display substrate and at least one data line on the array substrate of the liquid crystal display panel are commonly connected to a same connecting terminal of the driving chip.

6. The display apparatus according to claim 5, wherein pixel columns in the electroluminescent display substrate and pixel columns in the liquid crystal display panel are in one-to-one correspondence, and each pixel in the liquid crystal display panel consists of at least two sub pixels arranged in a row direction;
each data line on the electroluminescent display substrate corresponds to one of the pixel columns in the electroluminescent display substrate;
each data line on the array substrate of the liquid crystal display panel corresponds to one sub pixel column in the liquid crystal display panel; the data lines on the array substrate of the liquid crystal display panel, which correspond to the sub pixel columns of a same pixel column respectively, are connected with one connecting terminal, by controllable switching units connected with the data lines in one-to-one correspondence; and the respective data lines corresponding to the respective sub pixel columns of the same pixel column are connected with the respective controllable switching units, and the respective controllable switching units are configured to control time-sharing conduction of the connected data lines and the connecting terminal.

7. The display apparatus according to claim 5, wherein an optical prism film configured to uniformly disperse brightness of emergent light of the electroluminescent display substrate is arranged on a light emitting surface of the electroluminescent display substrate.

8. The display apparatus according to claim 6, wherein the respective controllable switching units are arranged on the array substrate of the liquid crystal display panel; and the array substrate further includes switching control lines of which the number is the same with that of the sub pixels which each pixel includes, and signal leads connected with the connecting terminals in one-to-one correspondence.

9. The display apparatus according to claim 6, wherein a color of light emitted from each pixel in the electroluminescent display substrate is white, and lights emitted from the sub pixels of a same pixel in the liquid crystal display panel are different in color.

10. The display apparatus according to claim 6, wherein an optical prism film for uniformly dispersing brightness of emergent light of the electroluminescent display substrate is arranged on a light emitting surface of the electroluminescent display substrate.

11. The display apparatus according to claim 8, wherein each controllable switching unit includes a switching transistor, wherein a source electrode of the switching transistor is connected with the data line, a drain electrode of the switching transistor is connected with the signal lead, and a gate electrode of the switching transistor is connected with the switching control line.

12. The display apparatus according to claim 8, wherein an optical prism film for uniformly dispersing brightness of emergent light of the electroluminescent display substrate is arranged on a light emitting surface of the electroluminescent display substrate.

13. The display apparatus according to claim 8, wherein a color of light emitted from each pixel in the electroluminescent display substrate is white, and lights emitted from the sub pixels of a same pixel in the liquid crystal display panel are different in color.

14. A three-dimensional display method of the display apparatus according to claim 4, comprising:

in a three-dimensional display mode, by the driving chip, controlling the respective pixels in the electroluminescent display substrate to form light emitting regions in a column direction and black regions in the column direction, which are arranged alternately; and controlling the pixel columns of a same light emitting region in the liquid crystal display panel to display different viewpoint images.

15. The method according to claim 14, wherein in the three-dimensional display mode, the driving chip inputs a low-level signal to a reference signal end connected with a source electrode of a drive transistor in a pixel circuit of the respective pixels constituting the black regions in the electroluminescent display substrate.

16. The display apparatus according to claim 4, wherein shift registers are respectively arranged on the array substrate of the liquid crystal display panel and the electroluminescent display substrate, and the signal lines includes signal lines for providing electric signals to the shift registers.

17. A display apparatus, comprising: a liquid crystal display panel including an array substrate, an electroluminescent display substrate fixed below the array substrate by a conductive optical clear adhesive, and a driving chip bonded on the electroluminescent display substrate or the array substrate, wherein a via hole at least passing through a base substrate of the array substrate is formed in the array substrate of the liquid crystal display panel; a signal line of the array substrate on an upper surface of the array substrate is connected with the driving chip combined on the electroluminescent display substrate, through the via hole and a conductive material in the optical clear adhesive on a lower surface of the array substrate, or a signal line on the electroluminescent display substrate is connected with the driving chip combined on an upper surface of the array substrate through a conductive material in the optical clear adhesive on a lower surface of the array substrate and the via hole; and the driving chip is configured to supply electric signals to the liquid crystal display panel and the electroluminescent display substrate; and shift registers are respectively arranged on the array substrate of the liquid crystal display panel and the electroluminescent display substrate, and the signal lines includes signal lines configured to provide electric signals to the shift registers.

* * * * *